(12) United States Patent
Dasgupta et al.

(10) Patent No.: US 10,747,818 B2
(45) Date of Patent: Aug. 18, 2020

(54) DATA TREND ANALYSIS BASED ON REAL-TIME DATA AGGREGATION

(71) Applicant: Bank of America Corporation, Charlotte, NC (US)

(72) Inventors: Amrita Dasgupta, Dallas, TX (US); Bhargav Aditya Ayyagari, Plano, TX (US); Jimmy Autin Carroll, Plano, TX (US); Lindsay Payne, New York, NY (US); Maruthi Shanmugam, Plano, TX (US); Prejish Thomas, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 217 days.

(21) Appl. No.: 16/042,636

(22) Filed: Jul. 23, 2018

(65) Prior Publication Data
US 2020/0026805 A1 Jan. 23, 2020

(51) Int. Cl.
*G06F 16/00* (2019.01)
*G06F 16/903* (2019.01)
*H04L 12/911* (2013.01)

(52) U.S. Cl.
CPC ........ *G06F 16/90335* (2019.01); *H04L 47/70* (2013.01)

(58) Field of Classification Search
CPC ................ G06F 16/90335; G06F 16/9035
See application file for complete search history.

(56) References Cited

U.S. PATENT DOCUMENTS

| 9,858,610 | B2 | 1/2018 | Goulart |
| 9,864,424 | B1* | 1/2018 | Templeton ............ G06F 1/3228 |
| 2012/0246684 | A1 | 9/2012 | Yarvis et al. |
| 2013/0290172 | A1 | 10/2013 | Mashinsky |
| 2014/0067596 | A1 | 3/2014 | McGovern et al. |
| 2014/0143057 | A1 | 5/2014 | Lessin et al. |
| 2015/0073954 | A1 | 3/2015 | Braff |
| 2015/0206087 | A1* | 7/2015 | Tavares ............ G06Q 10/06393 |
| | | | 705/7.34 |
| 2016/0364727 | A1* | 12/2016 | DeLawter .......... G06Q 20/4014 |
| 2017/0255956 | A1* | 9/2017 | Woodruff ............... G06Q 20/02 |
| 2018/0165775 | A1* | 6/2018 | Bhattacharjee .... G06Q 10/0639 |

\* cited by examiner

*Primary Examiner* — Thu Nguyet T Le
(74) *Attorney, Agent, or Firm* — Michael A. Springs (57) ABSTRACT

A system for performing data trend analysis is disclosed. The disclosed system categorizes a number of transaction records based on their associated merchant IDs. For each of the merchant ID, the system determines whether the determined number of transaction records exceeds a pre-determined threshold. In response to identifying a merchant ID with the determined number of transaction records that exceeds the pre-determined threshold, the system identifies a location associated with the merchant ID and generates a trending notification indicating a transaction burst. The system then identifies a set of users located in the location that have a transaction history with the merchant ID and sends the trending notification to the set of users.

20 Claims, 5 Drawing Sheets

| Transaction no. 202 | Merchant ID 143 | Transaction amount 144 | Time stamp 145 |
|---|---|---|---|
| #001 | Merchant ID 1 | $50.00 | 15:30/Jan 20/2018 |
| #002 | Merchant ID 2 | $210.00 | 10:45/Feb 12/2018 |
| #003 | Merchant ID 3 | $14.00 | 18:10/Mar 26/2018 |
| ... | ... | ... | ... |

| User 110 | Location 302 | Gender 304 | Age 306 | Transaction history 147 |
|---|---|---|---|---|
| User 1 | Dallas, TX | Male | 45 | Transaction #001, #005, ... |
| User 2 | Austin, TX | Female | 26 | Transaction #002, #003, ... |
| User 3 | San Jose, CA | Female | 19 | Transaction #004, #006, ... |
| ... | ... | ... | ... | ... |

DATA TREND ANALYSIS BASED ON REAL-TIME DATA AGGREGATION

TECHNICAL FIELD

This disclosure relates generally to performing data trend analysis, and more particularly to a system for performing data trend analysis based on real-time data aggregation.

BACKGROUND

The volume of data that enterprises can accumulate today is staggering. Traditional systems are not intrinsically designed to handle the scale of data required for present-day data analytics. Therefore, traditional data processing systems are unable to handle/process the data in a timely or efficient manner. The traditional systems use significant memory space for storing and significant computing powers for processing the data. The precious memory space of the underlying computer system, since now being used for storing and processing the large volume data, cannot be used for other operations. This places an increased burden on the computer system that processes the data, thereby decreasing the performance of the computer system. Furthermore, traditional systems may be unable to process the ingested raw data properly before transmitting them over the computer networks. Such raw data or coarse data are larger in size compared to specifically structured or processed data. These raw data or coarse data that are transmitted over the network creates a significant strain on the network, leading to network bottlenecks.

Furthermore, traditional systems tend to send data to users universally. For example, the traditional systems may send a report to every single user over the network. However, sending the report to every single user of the systems may create a significant burden on the network because the systems would send the report simultaneously to a significant number of users over the network. Furthermore, if the report is not read or accessed by some of the users, the network resources that are used for transmitting the report to these users are wasted. This further intensifies the network bottleneck.

SUMMARY

Enterprises or institutions receive raw data in large volumes on a daily basis. Most of the raw data is underutilized because conventional systems have proven inefficient at analyzing the raw data with insight. The conventional systems are not intrinsically designed to handle the scale of data required for present day data analytics. The traditional systems use significant memory space for storing and significant computing powers for processing the raw data received over the network. Furthermore, aggregating the raw data in such a large volume over the network creates a significant strain on the network because these raw data transmitted over the network consumes significant network bandwidth. This may cause network bottlenecks.

Moreover, enterprises or institutions employing conventional systems tend to be incapable of extracting useful information from raw data received over the network and providing relevant information to users. This results in a significant waste in computing resources and network resources.

As such, conventional systems may waste significant computing resources (e.g., processor power, computing time, memory space) on storing and analyzing data that are not relevant to users. Furthermore, sending the irrelevant information to users via a network would result in a waste of the network bandwidth because the users may not be interested in the irrelevant information thus may not read or access the irrelevant information. These network resources could have been used for sending other important data over the network. This may create a network bottleneck or intensify an already existing network bottleneck.

The present disclosure provides a system to effectively analyze data, extract useful information from the data that are relevant to users, and target users with relevant information. The present disclosure discloses a system and method that is specifically designed to aggregate data from multiple sources such that relevant data is identified for and sent to a target group of users. This facilitates conserving the memory space that are otherwise used for storing the irrelevant data. The memory space used for storing the irrelevant data may be freed up and used for other operations, which increases the processing speed of the system and improves the performance of the system. Furthermore, identifying relevant data for a target group of users and sending the relevant data only to the target group of users instead of all users facilitates conserving network resources. Furthermore, it is very likely that the target group of users would access or read the relevant data so that the network resources for transmitting the relevant data will not be wasted. This facilitates alleviating network bottlenecks.

One exemplary embodiment includes a system for aggregating transaction records between merchants and users, determining a trend occurring for a merchant at a particular location based on an analysis of the transaction records, identifying target users at the location that may be interested in the trending based on the users' demographics and transaction history, and sending the target users a notification of the trend. Specifically, the disclosed system receives a plurality of transaction records from a plurality of web servers. Each transaction record includes a merchant ID associated with a location, a transaction amount, and a timestamp.

Note that the transaction records collected from the web servers are in a large volume such that they would use a significant memory space for storage and significant computing powers for processing. This places a burden on the computer system that is processing the data, thereby decreasing the performance of the underlying computer system. The disclosed system performs pre-processing on the transaction records before performing further operations by grouping the transaction records based on their attributes. Specifically, the system groups the transaction records based on their merchant IDs. In this way, the system can perform future operations or data analytics on transaction records in only one or more relevant groups of users. The system does not need to process or transmit data for all users. This reduces the volume of data for processing by the system or transmitting over the network. This facilitates conserving computing resources that would otherwise be used for performing operations or data analytics on all transaction records and network resources that are used for transmitting all transaction records over the network.

For each group of transaction records associated with a merchant ID, the system determines a number of the transaction records that are associated with a timestamp within a pre-determined time period. Then, the system determines whether the determined number of transaction records exceeds a pre-determined threshold. The system may identify one or more groups of transaction records associated with one or more merchant IDs with the determined number of transaction records exceeding a pre-determined threshold. For example, the system may determine that a group of transaction records associated with a first merchant ID has the determined number of transaction records exceeding the pre-determined threshold. In response to identifying the first merchant ID, the system identifies a location associated with the first merchant ID. The system further generates a trending notification indicating that a transaction burst occurs for the first merchant ID at the location within the pre-determined time period.

Next, the system identifies a set of users that are associated with the location of the first merchant ID based on user account information of the users. From the set of users identified above, the system further identifies a subset of the users with a transaction history including at least one transaction record associated with the first merchant ID. Then, the system sends the trending notification to the identified subset of the users. In this way, the system can process or transmit data to only relevant users. The system does not need to process or transmit data for all users. This reduces the volume of data for processing by the system or transmitting over the network. This facilitates conserving network resources that would otherwise be used for sending the trending notification to all users over the network.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

Figure 1:
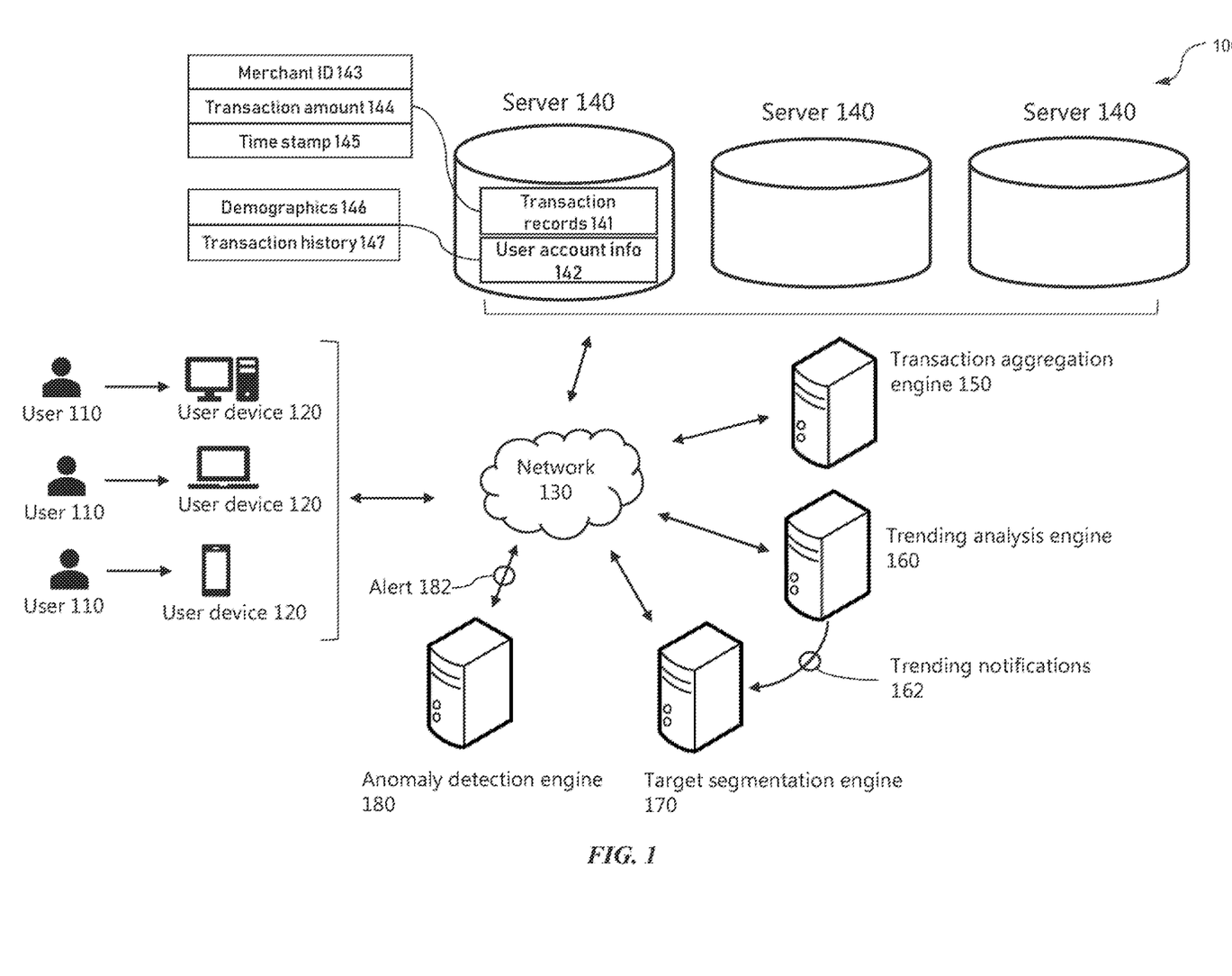
FIG. 1 illustrates an exemplary embodiment of a system for analyzing trending data, according to the present disclosure.

FIG. 1 illustrates an exemplary embodiment of a system 100 for performing trending analysis, according to certain embodiments of the present disclosure. System 100 includes one or more user devices 120, a network 130, one or more web servers 140, a transaction aggregation engine 150, a trending analysis engine 160, a target segmentation engine 170, and an anomaly detection engine 180.

In general, users 110 operate on user devices 120 to perform transactions with merchants having merchant IDs 143. System 100 generates transaction records 141 for the transactions and stores the transaction records 141 in the web servers 140 that are distributed over the network 130. Servers 140 further store user account information 142 including user demographics 146 and transaction history 147 associated with the users 110. Transaction aggregation engine 150 aggregates the transaction records 141 and performs pre-processing on the transaction records 141 for further trending analysis. Note that the transaction records 141 collected from the web servers 140 are in a large volume such that system 100 would use significant memory space for storing and significant computing powers for processing the transaction records 141. This places a burden on the computer system of traditional systems that processes the transaction records 141, thereby decreasing the performance of the computer system. System 100 performs pre-processing on the transaction records 141 before performing further operations by grouping the transaction records 141 based on their attributes. For example, transaction aggregation engine 150 may categorize the transaction records 141 based on merchant IDs 143 associated with the transaction records 141. In this way, system 100 can perform future operations or data analytics on transaction records 141 in only one or more groups in need. For example, the system 100 can process or transmit data to only relevant users 110. The system 100 does not need to process or transmit data for all users 110. This reduces the volume of data for processing by the system 100 or transmitting over the network 130. This facilitates conserving computing resources that would otherwise be used for performing operation or data analysis on all transaction records 141 and network resources that are used for transmitting all transaction records 141 to all users 110 over the network 130.

Next, trending analysis engine 160 of system 100 determines data trending by analyzing the transaction records 141 associated with each of the merchant IDs 143. For example, for each of the merchant IDs 143, trending analysis engine 160 may determine whether the associated transaction records 141 exceeds a pre-determined threshold within a pre-determined time period. Transaction records 141 associated with a merchant ID 143 exceeding a pre-determined threshold means that a data trending is occurring for the merchant ID 143. For example, transaction records 141 for an electronics merchant store exceeding a pre-determined threshold over a Memorial Day weekend may mean that the electronics merchant store has a big sale on electronic products over the Memorial Day weekend.

Traditional systems may be unable to provide such trending information to target users 110. For example, the data that is collected from the users 110 is not used effectively for giving insights on what the users 110 actually want and what the users 110 don't want. Traditional systems always have difficulties in giving the right information back to users 110 because they don't know what the users 110 really want. On the other side, users 110 also don't know what they want because of the lack of available information. One example is that a merchant store at a particular location 302 may have a big sale on computer components at a Memorial Day weekend. A user 110 who is located at the particular location 302 and is into computers may not know the big sale occurring and thus will miss a good opportunity to buy some computer components at a discounted price that the user 110 has been wanting to buy for a long time. In this example, the merchant store may not know that the user 110 is into computers and fail to notify the user 110 of the big sale of computer components. And the user 110 may have forgotten that he or she wants to buy some computer components because it has been a long time since the buying motivation first came into their mind.

As opposed to the traditional systems, system 100 of the present disclosure obtains the trending data associated with the merchant IDs 143 and sends the trending data to users 110. But the system 100 does not simply send the trending data to every single user 110 of the system. Instead, system 100 sends the trending data to a particular group of users 110 based on a correlation between the user account information 142 and information associated with a merchant ID 143. For example, trending analysis engine 160 of system 100 determines one or more merchant IDs 143 that are associated with transaction records 141 exceeding a pre-determined threshold within a pre-determined period. For the determined one or more merchant IDs 143, trending analysis engine 160 identifies locations 302 associated with them. For each of the determined merchant IDs 143, trending analysis engine 160 further generates a trending notification 162 indicating that a trending occurs for the determined merchant ID 143 at the identified location 302 within the pre-determined time period.

Next, target segmentation engine 170 of system 100 identifies users 110 that are located in the locations 302 associated with the determined merchant IDs 143. Among the users 110 that are located in the locations 302 of the determined merchant IDs 143, target segmentation engine 170 further determines a subset of the users 110 that have a transaction history 147 with the determined merchant IDs 143. Then, target segmentation engine 170 sends a trending notification 162 to the determined subset of the users 110. In this way, system 100 determines a data trending for a merchant ID 143 associated with a location 302, determines target users 110 located at the location 302 that have a transaction history 147 with the merchant ID 143, and sends the trending notification 162 to those target users 110. As such, system 100 performs a merchant ID 143 based and location-based data trending analysis. Note that system 100 performs data analysis, such as identifying locations 302 and generating trending notifications 162, on the subset of the merchant IDs 143 that have transaction records 141 exceeding a pre-determined threshold. This facilitates conserving computing resources that would otherwise be used for performing the data analysis on all merchant IDs 143. Furthermore, system 100 sends the trending notification 162 only to a selected subset of the users 110 instead of sending it to all users 110. This facilitates conserving network resources that would otherwise be used for sending the trending notification 162 to all users 110.

System 100 may further use anomaly engine 180 to detect data anomalies in the transaction records 141. One example of a data anomaly in the transaction records 141 is a transaction record 141 with a transaction amount 144 that is obviously higher than other transaction records 141. The detection of a data anomaly will be discussed in greater detail below.

Users 110 comprise any suitable users including businesses or other commercial organizations, government agencies, and/or individuals. Users 110 may operate on one or more user devices 120 to access system 100.

User devices 120 comprise any suitable devices or machines configured to communicate with other network devices in the system 100. Typically, user device 120 is a data processing system comprising hardware and software that communicates with the other network elements over a network, such as the Internet, an intranet, an extranet, a private network, or any other medium or link. These data processing systems typically include one or more processors, an operating system, one or more applications, and one or more utilities. Applications running on the data processing systems provide native support for web protocols including, but not limited to, support for Hypertext Transfer Protocol (HTTP), Hypertext Markup Language (HTML), and Extensible Markup Language (XML), among others. Examples of user devices 120 include, but are not limited to, desktop computers, mobile phones, tablet computers, and laptop computers.

Network 130 includes any suitable networks operable to support communication between components of system 100. Network 130 may include any type of wired or wireless communication channel capable of coupling together computing nodes. Network 130 may include any interconnecting system capable of transmitting audio, video, electrical signals, optical signals, data, messages, or any combination of the preceding. Network 130 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. Network 130 may be configured to support any communication protocols as would be appreciated by one of ordinary skill in the art upon viewing this disclosure.

Server 140 includes any suitable storage scheme including any software, hardware, firmware, and/or combination thereof capable of storing information. Exemplary server 140 includes individual data storage devices (e.g., memory, disks, solid-state drives), which may be part of individual storage engines and/or may be separate entities coupled to storage engines. Server 140 may store third-party databases, database management systems, a file system, and/or other entities that include or that manage data repositories. Server 140 may be locally located or remotely located to other components of system 100. As illustrated, in some embodiments, server 140 is configured to store transaction records 141 and user account information 142.

Figure 2:
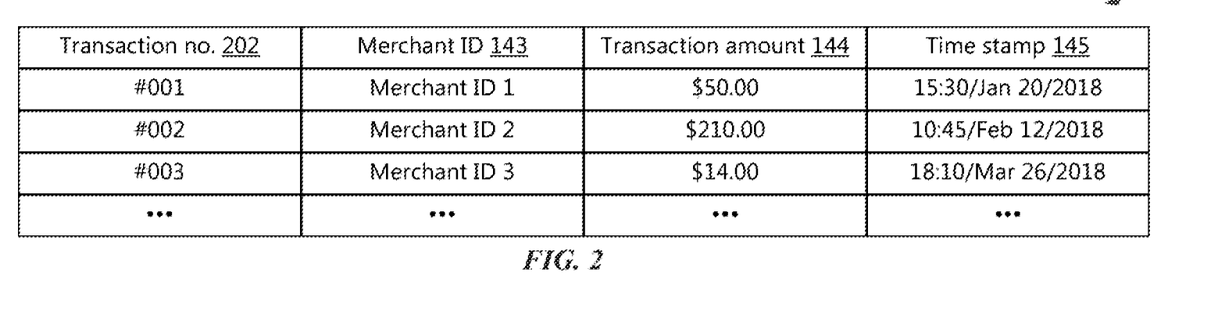
FIG. 2 illustrates an exemplary embodiment of a table of transaction records, according to the present disclosure.
Figure 3:
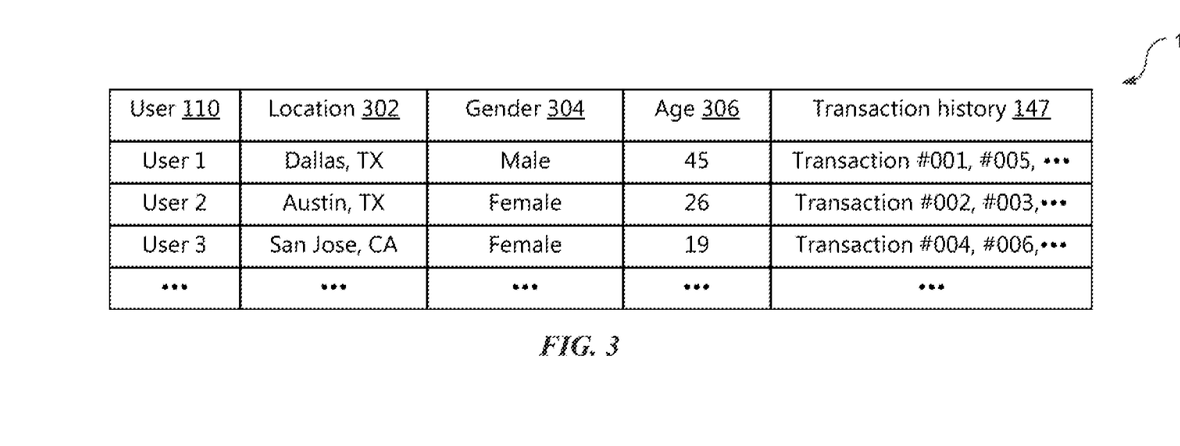
FIG. 3 illustrates an exemplary embodiment of a table of user account information, according to the present disclosure.

Transaction records 141 comprises merchant IDs 143, transaction amount 144, and timestamps 145. FIG. 2 illustrates example transaction records 141. As illustrated in FIG. 2, each transaction record 141 is identified by a transaction number 202. Each transaction number 202 is associated with a merchant ID 143, a transaction amount 144, and a timestamp 145. Referring back to FIG. 1, user account information 142 comprises demographics 146 and transaction history 147 associated with users 110. FIG. 3 illustrates an exemplary embodiment of user account information 142 comprising demographics 146 and transaction history 147 associated with users 110. As illustrated, user account information 142 includes demographics 146 comprising statistical data of users 110, such as for example, locations 302 associated with users 110, genders 302 associated with the users 110, and ages 306 associated with the users 110. Transaction history 147 includes transaction numbers 202 identifying transaction records 141 associated with users 110.

Transaction aggregation engine 150 includes a special purpose computer to implement the algorithm discussed herein. Specifically, transaction aggregation engine 150 is configured to collect the transaction records 141 from the web servers 140 over the network 130. Transaction aggregation engine 150 is further configured to perform pre-processing on the transaction records 141 for further trending analysis. Note that the transaction records 141 collected from the web servers 140 are in large volume such that system 100 would use significant memory space for storing and significant computing powers for processing the transaction records 141. This places a burden on the computer system of traditional systems that process the transaction records 141, thereby decreasing the performance of the computer system. Transaction aggregation engine 150 performs pre-processing on the transaction records 141 by grouping the transaction records 141 based on their attributes. Specifically, transaction aggregation engine 150 may group the transaction records 141 based on merchant IDs 143 associated with the transaction records 141. In this way, other components of system 100 can perform further operations or data analysis on transaction records 141 in only one or more groups in need. This facilitates conserving computing resources that would otherwise be used for performing operation or data analytics on all transaction records 141 and network resources that are used for transmitting all transaction records 141 over the network 130.

Trending analysis engine 160 includes a special purpose computer to perform data trending analysis discussed herein. Specifically, trending analysis engine 160 of system 100 is configured to determine a data trend by analyzing the transaction records 141 associated with each of the merchant IDs 143. For example, for each of the merchant IDs 143, trending analysis engine 160 may determine whether the associated transaction records 141 exceeds a pre-determined threshold within a pre-determined time period (e.g., 5 hours, 10 hours, 1 day). Transaction records 141 of a merchant ID 143 exceeding a pre-determined threshold means that a data trend is occurring for the merchant ID 143. For example, transaction records 141 for an electronics merchant store exceeding a pre-determined threshold at a Memorial Day weekend may mean that the electronics merchant store has a big sale on electronic products during the Memorial Day weekend. In some embodiments, trending analysis engine 160 of system 100 determines one or more merchant IDs 143 that have transaction records 141 exceeding a pre-determined threshold within a pre-determined time period. For the determined one or more merchant IDs 143, trending analysis engine 160 identifies locations 302 associated with them. In some embodiments, trending analysis engine 160 further generates a trending notification 162 indicating that a trending occurs for the determined merchant IDs in the locations 302 associated with the determined merchant IDs 143 within the pre-determined time period. In some embodiments, each merchant ID 143 is associated with a specific pre-determined threshold of transaction records 141 and a specific pre-determined time period for determining a trending. For example, trending analysis engine 160 may determine that a first merchant store with a first merchant ID 143 at a first location 302 has a number of transaction records 141 exceeding a first pre-determined threshold (e.g. three thousand transaction records 141) within a first pre-determined time-period (e.g., the past 5 hours). Trending analysis engine 160 may then generate a first trending notification 162 indicating that the first merchant store with the first merchant ID 143 at the first location 302 has a trending of transaction burst. In another example, trending analysis engine 160 may determine that a second merchant store with a second merchant ID 143 at a second location 302 has a number of transaction records 141 exceeding a second pre-determined threshold (e.g. five thousand transaction records 141) within a second pre-determined time-period (e.g., the past 10 hours). Trending analysis engine 160 may then generate a second trending notification 162 indicating that the second merchant store with the second merchant ID 143 at the second location 302 has a trending of transaction burst.

Target segmentation engine 170 includes a special purpose computer to determine target users 110 to send the trending notifications 162 as determined above by the trending analysis engine 160. Specifically, target segmentation engine 170 is configured to identify users 110 that are located in the locations 302 associated with the determined merchant IDs 143 as discussed above. Among the users 110 that are located at the identified locations 302 associated with the determined merchant IDs 143, target segmentation engine 170 may further determine a subset of the users 110 that have a transaction history 147 with the determined merchant IDs 143. For example, target segmentation engine 170 may determine a subset of the users 110 with a transaction history 147 identifying at least one transaction record 141 (e.g., transaction number 202) associated with the determined merchant IDs 143 and send the trending notifications 162 previously generated by the trending analysis engine 160 to the determined subset of the uses 110. In some embodiments, the transaction history 147 of the determined subset of users 110 may not include transaction records 141 with timestamps 145 within the pre-determined time period. This means that the determined subset of users 110 have not conducted any transactions with the determined merchant IDs 143 within the pre-determined time period. In this way, target segmentation engine 170 can identify users 110 that are frequent buyers for the determined merchant IDs 143 but did not perform any transaction with the determined merchant IDs within the pre-determined time period. It is very likely these users 110 would be interested in a sales trending for the determined merchant IDs 143. On the other hand, if the users 110 have conducted any transactions with the determined merchant IDs 143 within the pre-determined time period, it is likely that the users 110 may have already known the trending occurring for the determined merchant IDs 143. Therefore, sending trending notifications 162 to these users 110 may be unnecessary.

As such, target segmentation engine 170 determines the subset of the users 110 at the identified locations 302 of the determined merchant IDs 143 and having a transaction history 147 with the determined merchant IDs 143 outside the pre-determined period, and sends trending notifications 162 previously generated for the determined merchant IDs 143 to the determined subset of the users 110. In this way, target segmentation engine 170 sends the trending notifications 162 to target users 110 who are likely to be interested in the trending occurring for the determined merchant IDs 143 instead of all users. This facilitates conserving network resources that would otherwise be used for sending the trending notifications 162 to all users 110.

Figure 4:
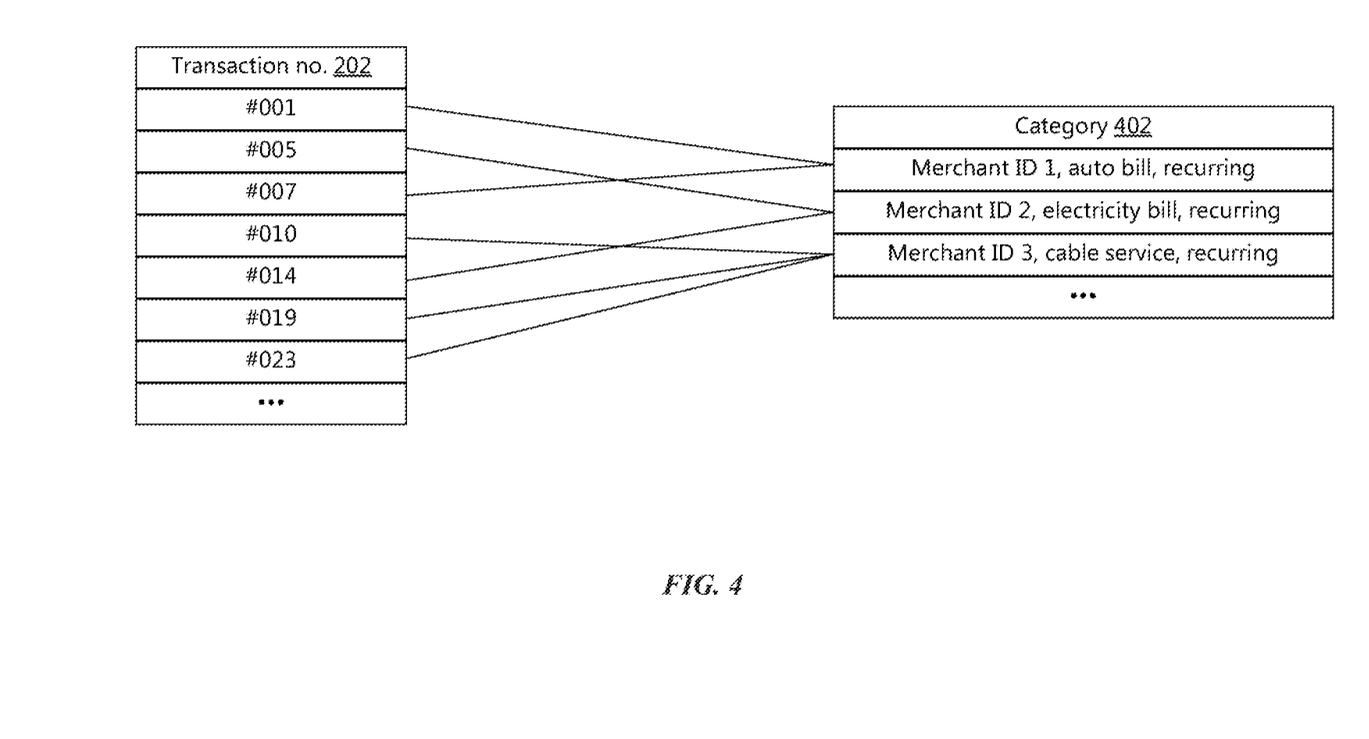
FIG. 4 illustrates an exemplary embodiment of categorizing transaction records, according to the present disclosure.

Anomaly detection engine 180 includes a special purpose computer to detect data anomalies in transaction records 141 associated with the users 110. For example, anomaly detection engine 180 may be configured to detect transaction records 141 with a transaction amount 144 that is notably higher than the transaction amount 144 of other transaction records 141 for a user 110. Specifically, anomaly detection engine 180 may identify transaction records 141 associated with a user 110 and categorize the transaction records 141 into multiple categories 402 based on merchant IDs 143 and other information. For example, in some embodiments, transaction records 141 in a category 402 may be recurring charges for a specific service (e.g., auto bill, electricity bill, cable service) from a merchant ID 143. FIG. 4 illustrates an exemplary embodiment of categorizing the transaction records 141 based on the merchant IDs 143, the type of service, and whether the transaction records 141 are recurring charges. Each category 402 of transaction records 141 may represent a recurring service from a merchant ID 143. Here, categorizing the transaction records 141 based on merchant IDs 143, service type, and recurring charges helps conserve computing resources and alleviate network bottleneck. For example, conventional systems may go through each and every one of the transaction records 141 without sorting them first. Without knowing what the transactions associated with the transaction records 141 are, conventional systems may detect spikes of transaction amounts 144 all over the place. For example, a first transaction record 141 may be associated with a transaction performed for buying a burrito for a few dollars, and a following transaction record 141 may be associated with a transaction performed for buying a computer for hundreds of dollars. A data analysis may show a spike of the transaction amount 144 at the second transaction record 141 for the computer. But such spike does not mean that the second transaction record 141 is a data anomaly. On the other hand, in one embodiment, anomaly detection engine 180 of system 100 categorizes the transaction records 141 based on merchant IDs 143, service type, and recurring charges so that only the categories of transaction records 141 including recurring charges for a merchant ID 143 will be examined for detecting data anomalies. This proves to be an efficient process because it conserves the computing resources that are otherwise used for examining all transaction records 141 and the network resources for transmitting all transaction records 141 over the network 130.

Then, for each of the categories 402, anomaly detection engine 180 computes an average transaction amount for the transaction records 141 in the category 402. In some embodiments, anomaly detection engine 180 computes an average transaction amount for the transaction records 141 in a category 402 within a pre-determined time period (e.g., 6 months, a year). The average transaction amount indicates a normal expenditure for a category 402 of transaction records 141. When system 100 receives a new transaction record 141 that that falls into a category 402, anomaly detection engine 180 compares the transaction amount 144 of the new transaction record 141 to the average transaction amount of the category 402 as previously computed. If the transaction amount 144 of the new transaction record 141 is higher than the average transaction amount exceeding a pre-determined threshold (e.g., 15%, 25%), anomaly detection engine 180 determines that the new transaction record 141 is potentially an anomaly. Anomaly detection engine 180 may generate an alert 182 to system 100 indicating that there is a data anomaly of the new transaction record 141.

Figure 5:
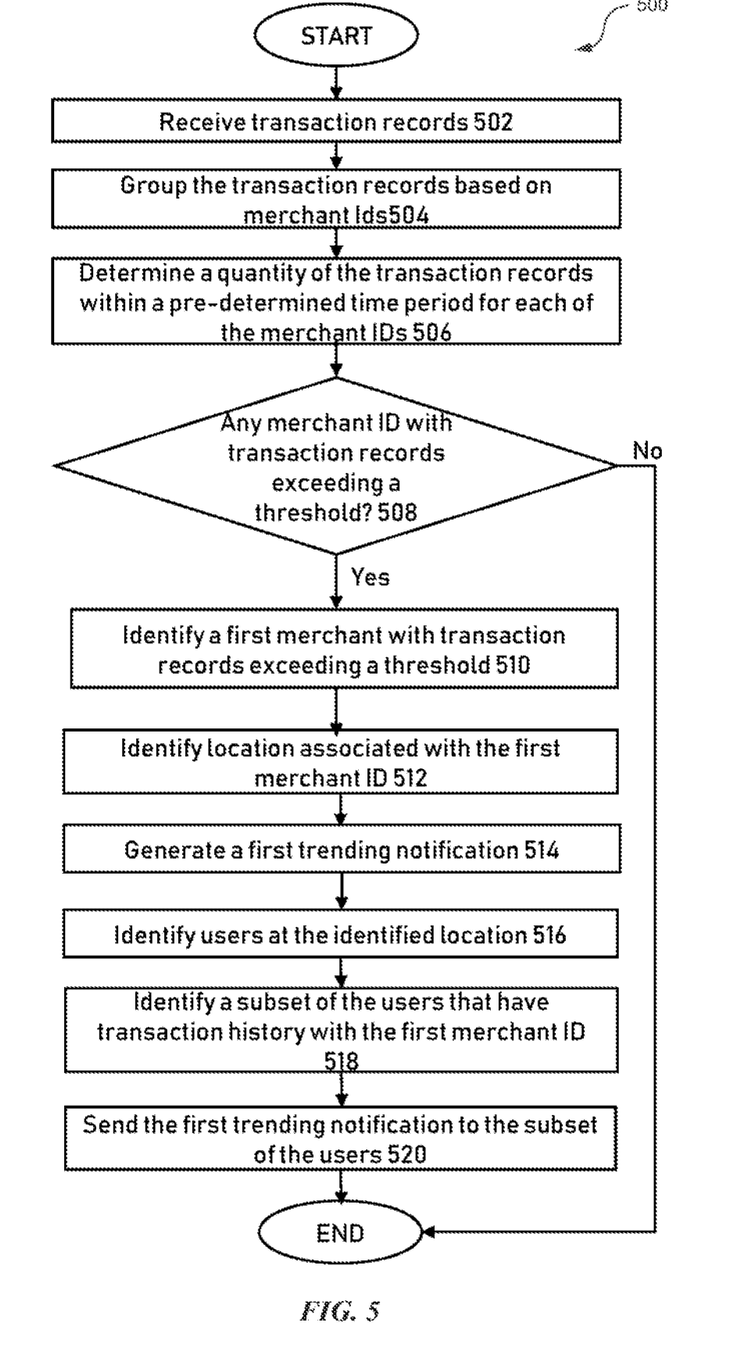
FIG. 5 illustrates a flow chart presenting an exemplary embodiment of a method of analyzing trending data, according to the present disclosure.

FIG. 5 illustrates a flow chart presenting an exemplary embodiment of a process 500 of analyzing data trending, according to the present disclosure. The following is a non-limiting example that illustrates how system 100 implements method 500.

Upon starting the process, method 500 receives transaction records 141 at step 502. For example, system 100 may receive the transaction records 141 from users 110 that operate on user devices 120 over the network 130. Transaction records 141 include transaction information of transactions conducted by the users 110. Each of the transaction records 141 includes a merchant ID, a transaction amount 144, and a timestamp 145 associated with a transaction. System 100 may receive and store the transaction records 141 at multiple web servers 140 distributed over the network 130. The web servers 140 may further be configured to store user account information 142 including demographics 146, and transaction history 147. Note that the transaction records 141 collected from the web servers 140 are in a large volume such that system 100 would use significant memory space for storing and significant computing powers for processing the transaction records 141. Furthermore, these transaction records 141 transmitted over the network 130 place a strain on the network, which leads to network bottlenecks. The following steps of method 500 facilitate solving these technical problems by, among other things, pre-processing transaction records 141.

Execution proceeds to step 504 where the transaction records 141 are grouped. For example, transaction aggregation engine 150 of system 100 may group the transaction records 141 based on merchant IDs 143 associated with the transaction records 141. In this way, system 100 may perform future operations or data analysis on transaction records 141 in only one or more groups in need. For example, the system 100 can process or transmit data to only relevant users 110. The system 100 does not need to process or transmit data for all users 110. This reduces the volume of data for processing by the system 100 or transmitting over the network 130. This facilitates conserving computing resources that would otherwise be used for performing operation or data analysis on all transaction records 141 and network resources that are used for transmitting all transaction records 141 over the network 130.

After grouping the transaction records 141 based on merchant IDs 143, system 100 may continue to determine whether a group of transaction records 141 associated with a merchant ID 143 shows a data trend such as a transaction burst within a short time period. Specifically, method 500 determines a number of the transaction records 141 associated with each of the merchant IDs 143 (step 506).

Then, method 500 proceeds to determine whether any of the merchant IDs 141 is associated with a number of the transaction records 141 exceeding a pre-determined threshold within a pre-determined time period (step 508). For example, for each of the merchant IDs 143, trending analysis engine 160 of system 100 may determine whether the associated transaction records 141 exceeds a pre-determined threshold (e.g., 3000, 5000) within a pre-determined time period (e.g., 5 hours, 10 hours). Transaction records 141 associated with a merchant ID 143 exceeding a pre-determined threshold within a pre-determined time period means that a data trend is occurring for the merchant ID 143. For example, transaction records 141 for an electronics merchant store exceeding a pre-determined threshold during a Memorial Day weekend may mean that the electronics merchant store has a big sale on electronic products at the Memorial Day weekend. If method 500 determines that at least one of the merchant IDs 141 is associated with a number of the transaction records 141 exceeding a pre-determined threshold within a pre-determined time period, method 500 proceeds to step 510.

In some embodiments, method 500 determines one or more merchant IDs 143 that are associated with transaction records 141 exceeding a pre-determined threshold within a pre-determined time period (step 510). For example, trending analysis engine 160 may determine that a first merchant store with a first merchant ID 143 has a number of the transaction records 141 exceeding a first pre-determined threshold (e.g. three thousand transaction records 141) within a first pro-determined time-period (e.g., the past 5 hours).

At step 512, method 500 determines locations 302 associated with the merchant IDs 143 as determined above in step 510. By identifying the locations 302, system 100 can perform a location-based trending analysis. The locations 302 of the determined merchant IDs 143 will be used to determine target users 110 to send the trending notifications 162 as discussed below.

At step 514, method 500 generates a trending notification 162 for the determined merchant IDs 143. For example, trending analysis engine 160 may determine that a first merchant store with a first merchant ID 143 at a first location 302 has a quantity of the transaction records 141 exceeding a first pre-determined threshold (e.g. 3000) within a first pre-determined time-period (e.g., the past 5 hours). Trending analysis engine 160 may then generate a first trending notification 162 indicating that the first merchant store with the first merchant ID 143 at the first location 302 has a trend of transaction burst. In another example, trending analysis engine 160 may determine that a second merchant store with a second merchant ID 143 at a second location 302 has a quantity of the transaction records 141 exceeding a second pre-determined threshold (e.g. 5000) within a second pre-determined time-period (e.g., the past 10 hours). Trending analysis engine 160 may then generate a 10 second trending notification 162 indicating that the second merchant store with the second merchant ID 143 at the second location 302 has a trend of transaction bursts. Note that in the above examples, each merchant ID 143 is associated with a specific pre-determined threshold of transaction records 141 and a specific pre-determined time period for determining a trend.

After generating the trending notifications 162, system 100 determines target users 110 to send the trending notifications 162. At step 516, method 500 identifies users 110 that are located in the locations 302 as determined above in step 512. Method 500 may determine the locations 302 of the users 110 based on the demographics 146 of user account information 142. The demographics 146 includes locations 302, genders 304, and ages 306 associated with the users 110.

At step 518, method 500 continues to determine a subset of the users 110 that have transaction history with the determined merchant IDs 143. For example, target segmentation engine 170 may determine a subset of the users 110 with a transaction history 147 identifying at least one transaction record 141 (e.g., transaction number 202) associated with the determined merchant IDs 143. Users 110 with a transaction history 147 with the determined merchant IDs 143 are likely to be interested in receiving trending notifications 162 about the determined merchant IDS 143. In some embodiments, the transaction history 147 of the determined subset of users 110 may not include transaction records 141 with timestamps 145 within the pre-determined time period. This means that the determined subset of the users 110 have not conducted any transactions with the determined merchant IDs 143 within the pre-determined time period. In this way, target segmentation engine 170 can identify users 110 that are frequent buyers for the determined merchant IDs 143 but did not perform any transaction with the determined merchant IDs within the pre-determined time period. It is very likely these users 110 would be interested in a sales trend for the determined merchant IDs 143. On the other hand, if the users 110 have conducted any transactions with the determined merchant IDs 143 within the pre-determined time period, it is likely that the users 110 may have already known the trend occurring for the determined merchant IDs 143. Therefore, sending trending notifications 162 to these users 110 may be unnecessary.

At step 520, method 500 sends the trending notifications 162 as generated at step 514 to the selected subset of users 110 as determined in step 518. As noted before, method 500 determines the subset of the users 110 having a transaction history 147 with the determined merchant IDs 143 outside the pre-determined time period and sends trending notifications 162 to the determined subset of the users 110. In this way, method 500 sends the trending notifications 162 to target users 110 who are likely to be interested in the trending occurring for the determined merchant IDs 143 instead of all users. This facilitates conserving network resources that would otherwise be used for sending the trending notifications 162 to all users 110.

Figure 6:
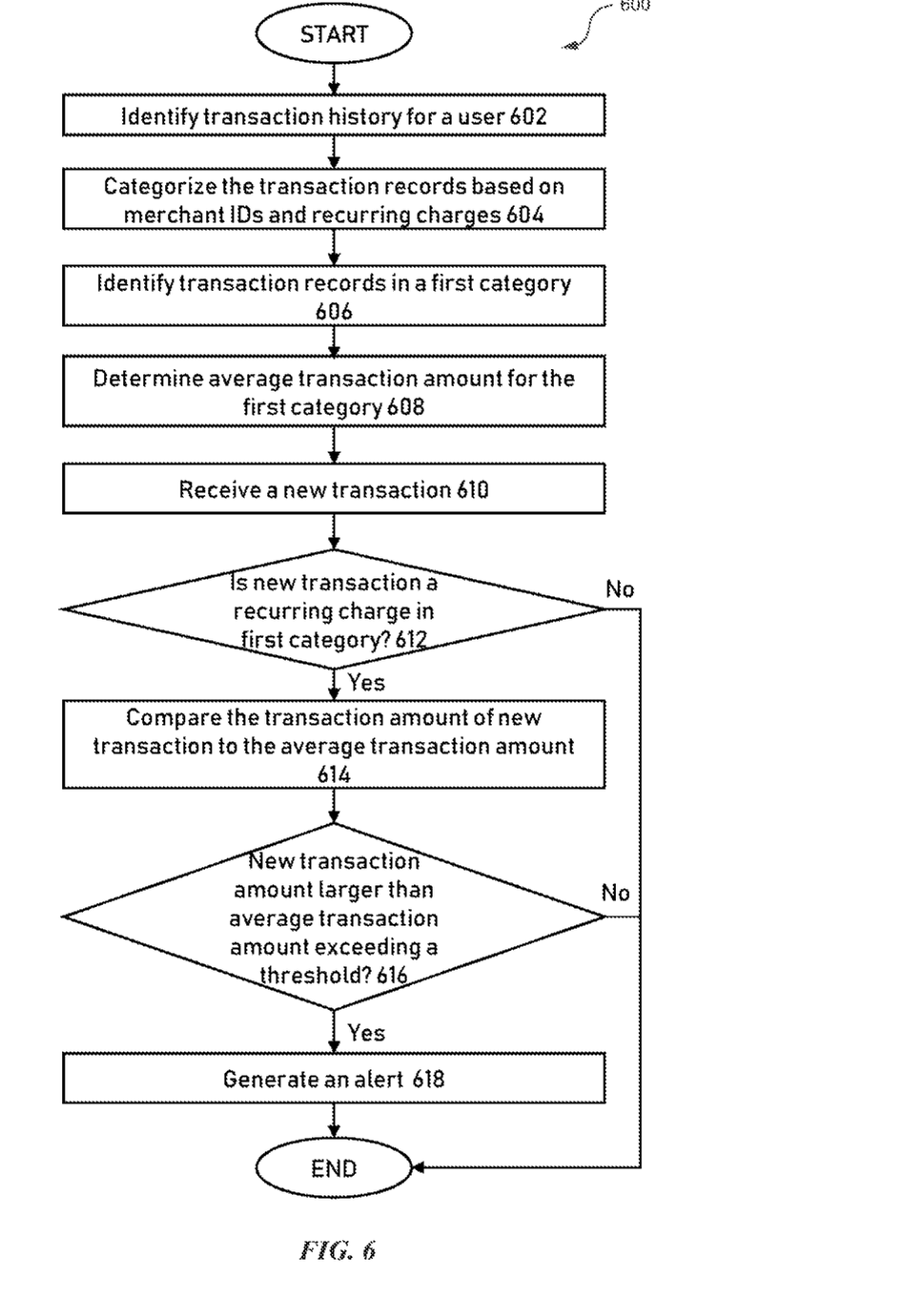
FIG. 6 illustrates a flow chart presenting an exemplary embodiment of a method of detecting data anomaly, according to the present disclosure.

FIG. 6 illustrates a flow chart presenting an exemplary embodiment of a method 600 of detecting data anomalies, according to the present disclosure. The following is a non-limiting example that illustrates how system 100 implements method 600 to detect transaction records 141 with a transaction amount 144 that is higher than the transaction amount 144 of other transaction records 141 for a user 110.

Execution starts at step 602 where method 600 identifies a transaction history 147 associated with a user 110. The transaction history 147 includes transaction numbers 202 identifying transaction records 141 associated with the user 110.

At step 604, method 600 categorizes the transaction records 141 of the user 110 based on merchant IDs 143 and other information such as service type and recurring charges. For example, method 600 may create multiple categories 402 of transaction records 141 and each of the categories 402 is associated with a merchant ID 143. In some embodiments, transaction records 141 in a category 402 may be recurring charges for a service (e.g., auto bill, electricity bill, cable service) from a merchant ID 143.

After categorizing the transaction records 141, method 600 continues to detect data anomalies in each of the categories 402. At step 606, method 600 identifies a first category 402 and the transaction records 141 associated with the first category 402.

At step 608, method 600 proceeds to compute an average transaction amount for the transaction records 141 in the first category 402 as identified at step 606. In some embodiments, method 600 computes an average transaction amount for the transaction records 141 in the first category 402 within a pre-determined time period (e.g., 6 months, a year). The average transaction amount indicates a normal expenditure for transaction records 141 of a category 402.

At step 610, method 600 receives a new transaction record 141. The new transaction record 141 is associated with a merchant ID 143, a transaction amount 144, and a timestamp 145.

At step 612, method 600 determines whether the new transaction record 141 is a recurring charge under the first category 402 as identified at step 606. For example, method 600 may compare the merchant ID 143 associated with the new transaction record 141 to the merchant ID 143 associated with the first category 402. Method 600 may also determine a service type of the new transaction record 141 and compare the determined service type to the service type associated with the first category 402. If the method 600 determines that new transaction record 141 is a recurring charge in the first category 402, method 600 proceeds to step 614.

At step 614, method 600 compares the transaction amount 144 of the new transaction record 141 to the average transaction amount of the first category 402 as determined at step 608.

At step 616, method 600 determines whether the transaction amount 144 of the new transaction record 141 is notably higher than the average transaction amount of the first category 402. Specifically, if method 600 determines that the transaction amount 144 of the new transaction record 141 is higher than the average transaction amount of the first category 402 exceeding a pre-determined threshold (e.g., 15%, 25%), method 600 proceeds to step 618.

As step 618, method 600 generates a notification upon determining that the transaction amount 144 of the new transaction record 141 is higher than the average transaction amount of the first category 402 exceeding a pre-determined threshold. Specifically, method 600 generates an alert 182 to system 100 indicating that there is a data anomaly of the new transaction record 141 in the first category 402.

Method 600 may continue to detect data anomaly for other categories 402 of the transaction records 141. If method 600 detects data anomalies in other categories 402, method 600 generates one or more alerts 182 to notify the system 100 of the data anomaly.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skill in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for analyzing data trend, comprising:
a plurality of servers configured to store:
a plurality of transaction records, each transaction record comprising at least a merchant ID, a transaction amount, and a time stamp, the merchant ID being associated with a location, each transaction record being associated with a user, and
user account information associated with a plurality of users, the user account information comprising demographics and transaction history associated with the users, the demographics comprising at least locations associated with the users, the transaction history identifying transaction records associated with each of the users;
a transaction aggregation engine configured to:
receive the plurality of transaction records from the plurality of servers; and
categorize the plurality of transaction records based on their associated merchant IDs;
a trending analysis engine configured to:
for each of the merchant ID, determine a number of the transaction records associated with the merchant ID that are associated with a time stamp within a pre-determined time period;
for each of the merchant ID, determine whether the determined number of transaction records exceeds a pre-determined threshold;
identify at least a first merchant ID with the determined number of transaction records that exceeds the pre-determined threshold;
identify a first location associated with the first merchant ID; and
generate a first trending notification indicating that a transaction trending occurs for the first merchant ID in the first location within the pre-determined time period; and
a target segmentation engine configured to:
identify a first set of users that are associated with the first location based on the demographics in the user account information;
identify a subset of the first set of users with a transaction history identifying at least one transaction record that is associated with the first merchant ID; and
send the first trending notification to the subset of the first set of users.

2. The system of claim 1, wherein the demographics associated with the users further comprises gender information or age information associated with the users.

3. The system of claim 1, wherein the at least one transaction record identified by the transaction history associated with the subset of the first set of users is associated with a time stamp outside the pre-determined time period.

4. The system of claim 1, wherein the trending analysis engine is further configured to:
identify a second merchant ID with the determined number of transaction records that exceeds the pre-determined threshold within the pre-determined time period;
identify a second location associated with the second merchant ID; and
generate a second trending notification indicating that a transaction trending occurs for the second merchant ID in the second location within the pre-determined time period.

5. The system of claim 4, wherein the target segmentation engine is further configured to:
identify a second set of users that are associated with the second location based on the demographics in the user account information;
identify a subset of the second set of users with a transaction history identifying at least one transaction record that is associated with the second merchant ID; and
send the second trending notification to the subset of the second set of users.

6. The system of claim 1, wherein the system further comprises an anomaly detection engine, the anomaly detection engine configured to:
identify a first user with a transaction history identifying a set of transaction records associated with the first user;
categorize the set of transaction records into one or more sub-categories based on the merchant IDs associated with the set of transaction records, the one or more sub-categories comprising at least a first sub-category of the transaction records that are recurring charges for a particular service from the first merchant ID; and
determine an average transaction amount for the first sub-category of the transaction records.

7. The system of claim 6, wherein the anomaly detection engine is further configured to:
receive a new transaction record for the first user;
determine that the new transaction record is a recurring charge for the particular service associated with the first merchant ID;
compare a transaction amount of the new transaction record to the determined average transaction amount; and
in response to determining that the transaction amount of the new transaction record is larger than the determined average transaction amount exceeding a pre-determined threshold, generate a notification indicating that the new transaction record is potentially being anomaly.

8. A non-transitory computer-readable medium comprising a logic for analyzing data trend, the logic, when executed by one or more processors, instructing the one or more processors to:
store a plurality of transaction records, each transaction record comprising at least a merchant ID, a transaction amount, and a time stamp, the merchant ID being associated with a location, each transaction record being associated with a user;
store user account information associated with a plurality of users, the user account information comprising demographics and transaction history associated with the users, the demographics comprising at least locations associated with the users, the transaction history identifying transaction records associated with each of the users;
receive the plurality of transaction records from the plurality of servers;
categorize the plurality of transaction records based on their associated merchant IDs;
for each of the merchant ID, determine a number of the transaction records associated with the merchant ID that are associated with a time stamp within a pre-determined time period;
for each of the merchant ID, determine whether the determined number of transaction records exceeds a pre-determined threshold;
identify at least a first merchant ID with the determined number of transaction records that exceeds the pre-determined threshold;
identify a first location associated with the first merchant ID;
generate a first trending notification indicating that a transaction trending occurs for the first merchant ID in the first location within the pre-determined time period;
identify a first set of users that are associated with the first location based on the demographics in the user account information;
identify a subset of the first set of users with a transaction history identifying at least one transaction record that is associated with the first merchant ID; and
send the first trending notification to the subset of the first set of users.

9. The non-transitory computer-readable medium of claim 8, wherein the demographics associated with the users further comprises gender information or age information associated with the users.

10. The non-transitory computer-readable medium of claim 8, wherein the at least one transaction record identified by the transaction history associated with the subset of the first set of users is associated with a time stamp outside the pre-determined time period.

11. The non-transitory computer-readable medium of claim 8, wherein the logic, when executed by the one or more processors, further instructs the one or more processors to:
identify a second merchant ID with the determined number of transaction records that exceeds the pre-determined threshold within the pre-determined time period;
identify a second location associated with the second merchant ID; and
generate a second trending notification indicating that a transaction trending occurs for the second merchant ID in the second location within the pre-determined time period.

12. The non-transitory computer-readable medium of claim 11, wherein the logic, when executed by the one or more processors, further instructs the one or more processors to:
identify a second set of users that are associated with the second location based on the demographics in the user account information;
identify a subset of the second set of users with a transaction history identifying at least one transaction record that is associated with the second merchant ID; and
send the second trending notification to the subset of the second set of users.

13. The non-transitory computer-readable medium of claim 8, wherein the logic, when executed by the one or more processors, further instructs the one or more processors to:
identify a first user with a transaction history identifying a set of transaction records associated with the first user,
categorize the set of transaction records into one or more sub-categories based on the merchant IDs associated with the set of transaction records, the one or more sub-categories comprising at least a first sub-category of the transaction records that are recurring charges for a particular service from the first merchant ID; and
determine an average transaction amount for the first sub-category of the transaction records.

14. The non-transitory computer-readable medium of claim 13, wherein the logic, when executed by the one or more processors, further instructs the one or more processors to:
receive a new transaction record for the first user;
determine that the new transaction record is a recurring charge for the particular service associated with the first merchant ID;
compare a transaction amount of the new transaction record to the determined average transaction amount; and
in response to determining that the transaction amount of the new transaction record is larger than the determined average transaction amount exceeding a pre-determined threshold, generate a notification indicating that the new transaction record is potentially being anomaly.

15. A method for analyzing data trend, comprising:
storing a plurality of transaction records, each transaction record comprising at least a merchant ID, a transaction amount, and a time stamp, the merchant ID being associated with a location, each transaction record being associated with a user;

storing user account information associated with a plurality of users, the user account information comprising demographics and transaction history associated with the users, the demographics comprising at least locations associated with the users, the transaction history identifying transaction records associated with each of the users;

receiving the plurality of transaction records from the plurality of servers;

categorizing the plurality of transaction records based on their associated merchant IDs;

for each of the merchant ID, determining a number of the transaction records associated with the merchant ID that are associated with a time stamp within a pre-determined time period;

for each of the merchant ID, determining whether the determined number of transaction records exceeds a pre-determined threshold;

identifying at least a first merchant ID with the determined number of transaction records that exceeds the pre-determined threshold;

identifying a first location associated with the first merchant ID;

generating a first trending notification indicating that a transaction trending occurs for the first merchant ID in the first location within the pre-determined time period;

identifying a first set of users that are associated with the first location based on the demographics in the user account information;

identifying a subset of the first set of users with a transaction history identifying at least one transaction record that is associated with the first merchant ID; and sending the first trending notification to the subset of the first set of users.

16. The method of claim 15, wherein the at least one transaction record identified by the transaction history associated with the subset of the first set of users is associated with a time stamp outside the pre-determined time period.

17. The method of claim 15, wherein the method further comprises:

identifying a second merchant ID with the determined number of transaction records that exceeds the pre-determined threshold within the pre-determined time period;

identifying a second location associated with the second merchant ID; and generating a second trending notification indicating that a transaction trending occurs for the second merchant ID in the second location within the pre-determined time period.

18. The method of claim 17, wherein the method further comprises:

identifying a second set of users that are associated with the second location based on the demographics in the user account information;

identifying a subset of the second set of users with a transaction history identifying at least one transaction record that is associated with the second merchant ID; and sending the second trending notification to the subset of the second set of users.

19. The method of claim 15, wherein the method further comprises:

identifying a first user with a transaction history identifying a set of transaction records associated with the first user;

categorizing the set of transaction records into one or more sub-categories based on the merchant IDs associated with the set of transaction records, the one or more sub-categories comprising at least a first sub-category of the transaction records that are recurring charges for a particular service from the first merchant ID; and determining an average transaction amount for the first sub-category of the transaction records.

20. The method of claim 19, wherein the method further comprises:

receiving a new transaction record for the first user, determining that the new transaction record is a recurring charge for the particular service associated with the first merchant ID;

comparing a transaction amount of the new transaction record to the determined average transaction amount; and in response to determining that the transaction amount of the new transaction record is larger than the determined average transaction amount exceeding a pre-determined threshold, generating a notification indicating that the new transaction record is potentially being anomaly.

* * * * *

UNITED STATES PATENT AND TRADEMARK OFFICE
CERTIFICATE OF CORRECTION

PATENT NO. : 10,747,818 B2 Page 1 of 1
APPLICATION NO. : 16/042636
DATED : August 18, 2020
INVENTOR(S) : Amrita Dasgupta et al.

It is certified that error appears in the above-identified patent and that said Letters Patent is hereby corrected as shown below:

On the Title Page

In Item (72) Third Inventor delete "Autin", insert --Austin--.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*